United States Patent [19]

Berne

[11] Patent Number: 4,720,347
[45] Date of Patent: Jan. 19, 1988

[54] METHOD AND APPARATUS FOR THE FILTRATION OF A SUSPENSION BY A GRANULAR FILTRATING LAYER

[75] Inventor: François Berne, Suresnes, France
[73] Assignee: Degremont, Hauts de Seine, France
[21] Appl. No.: 783,637
[22] Filed: Oct. 3, 1985
[30] Foreign Application Priority Data
   Oct. 29, 1984 [FR] France ................... 84 16491
[51] Int. Cl.$^4$ .................. B01D 23/10; B01D 23/24
[52] U.S. Cl. ..................... 210/792; 210/139;
   210/189; 210/268; 210/274; 210/269; 210/795
[58] Field of Search ............... 210/140, 268, 274, 280,
   210/792, 794, 795, 189, 269, 275, 277, 139, 138,
   739, 675, 676, 678, 786, 106, 673

[56] References Cited

U.S. PATENT DOCUMENTS

| | | | |
|---|---|---|---|
| 3,455,819 | 7/1969 | Crits | 210/274 |
| 3,619,426 | 11/1971 | Blain et al. | 210/138 |
| 4,197,201 | 4/1980 | Hjelmnér et al. | 210/268 |
| 4,229,292 | 10/1980 | Mori et al. | 210/140 |

FOREIGN PATENT DOCUMENTS

| | | | |
|---|---|---|---|
| 311900 | 4/1919 | Fed. Rep. of Germany | 210/189 |
| 53-39566 | 4/1978 | Japan | 210/792 |

Primary Examiner—Richard V. Fisher
Assistant Examiner—Linda S. Evans
Attorney, Agent, or Firm—Wenderoth, Lind & Ponack

[57] ABSTRACT

A suspension is filtered by a granular filtrating layer while flowing through the granular filtrating mass as a vertical ascending current. The granular mass is, for the purpose of being washed with air, driven continuously by a compressed air ejector into a tube where it follows an ascending motion and at the outlet of which it is washed with water above the layer where the filtration is carried out. Thereafter, the washed mass is recycled by gravity onto the upper portion of the filtration layer. The charged granular mass which has been subjected to the first or air washing operation is fluidized above the filtration layer and subjected to an extra washing operation with water and pressurized air.

11 Claims, 1 Drawing Figure

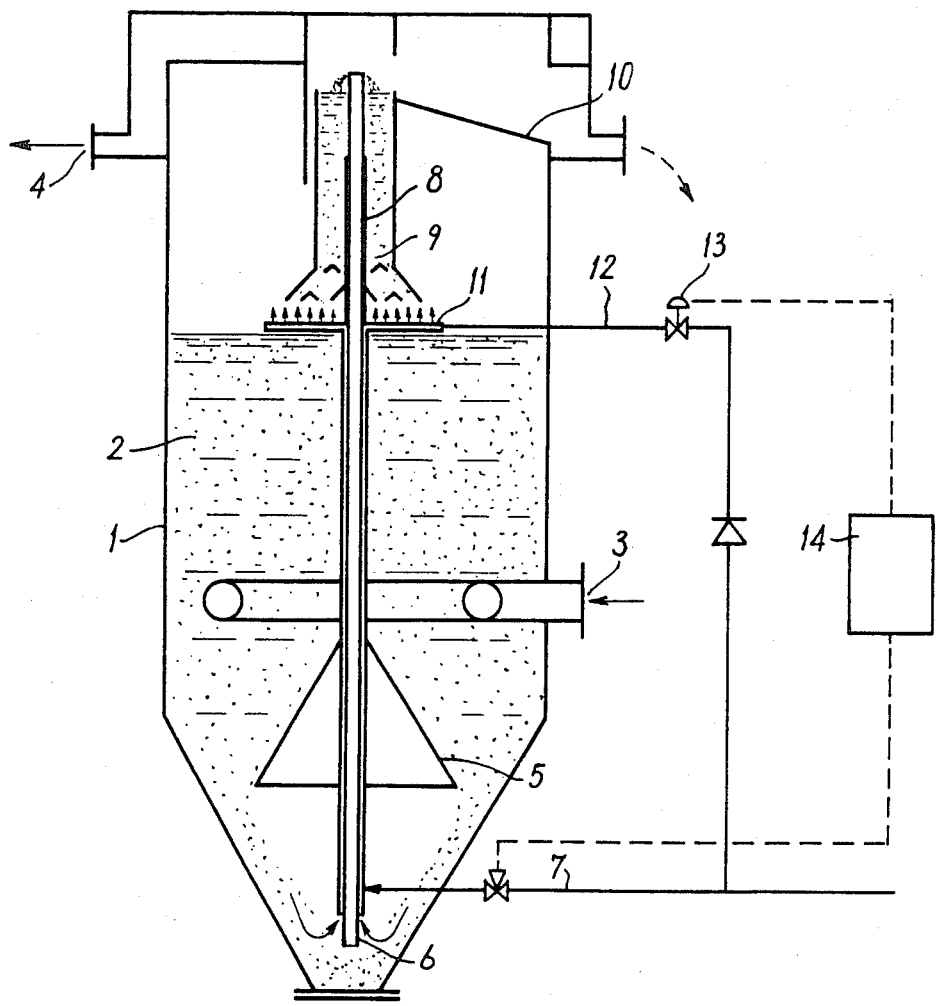

METHOD AND APPARATUS FOR THE FILTRATION OF A SUSPENSION BY A GRANULAR FILTRATING LAYER

TECHNICAL FIELD AND BACKGROUND OF THE PRIOR ART

This invention relates to a method for the filtration of a suspension by a granular filtrating layer, and an apparatus for practicing the method, of the type for the continuous filtration of sand, usable for the treatment of waters of all nature for the filtration of suspensions or emulsions.

A filter with a granular filtrating layer becomes dirty after a certain period of operation and requires regeneration of the filtrating mass. It is known that, in order to avoid interruption of the filtering of the fluid to be filtered during regeneration of the filtrating mass and therefore to ensure a continuous operation of the filter, to circulate and clean the filtrating mass while maintaining constant the flow rate of the fluid to be filtered.

Several apparatus have already been described for practicing this atype of method. The filtration is carried out with a current flowing upwardly through a granular mass of sand, and the dirty sand is extracted in a countercurrent direction by using an air or water ejector, also taking part in the regeneration operation.

The recovery of the sand is usually continuous. In some methods, washing of the sand is effected outside the filter. Portions of the sand are extracted, regenerated and recycled without interruption of the operation of the filter. Such apparatus requires complex and costly equipment.

In other known methods, washing of the sand is carried out with compressed air, an air ejector disposed in the central portion of the filter allowing at the same time the recovery of the sand through a central tube and washing of the sand with air in such central tube, the sand being subjected to a washing operation with water at the upper portion of the filter.

Such methods have, however, disadvantages. The speed of passage of the sand in the central tube sometimes is too high, and air pockets form and do not participate in the washing of the sand. Moreover, abrasion hazards are high, as well as losses of sand by attrition. The consumption of compressed air is continuous. Moreover, the practicing of such methods requires a cylindrical apparatus of great height, provided with extra devices such as dispersion cones for the washed sand.

OBJECTS AND SUMMARY OF THE INVENTION

The invention allows doing away with such disadvantages. Moreover, the invention enables the volume of the washed sand to be adapted to the level of clogging of the filter, and therefore makes it possible to regulate the transfer cycles of the sand and to optimize the consumption of compressed air.

According to the method of the invention for the filtration of a suspension by a granular filtrating layer in which the fluid to be treated flows through the granular mass as a vertical ascending current, the granular mass is, with a view to its being washed with a gas such as air, driven continuously by means of a compressed air ejector in a tube where it follows an ascending motion and at the outlet of which it is washed with water above the layer where the filtration operation is carried out, after which the washed mass is recycled by gravity back to the upper portion of the filtration layer. The charged granular mass which has been subjected to the first washing operation is fluidized above the filtration layer and subjected to an extra washing operation with water and pressurized air.

According to the invention, the air for pressurized fluidization and extra washing of the granular mass is at a pressure of 0.1 to 0.4 bar, and the compressed air for the recovery of the granular mass is at a pressure of 3 to 4 bars.

According to a preferred embodiment of the invention, the supplying to the apparatus of the pressurized air and the compressed air is intermittent and advantageously synchronous.

The invention relates also to an apparatus for practicing such method and includes a filtration apparatus in the form of a closed enclosure of cylindrical and conical shape including a filtration zone of a granular filtrating layer, means for introducing the fluid to be treated into a lower portion of the filtrating layer, and means for recovering the filtrated water at an upper portion of the apparatus. Above the filtration zone is a washing zone into which opens an axial tube fed at its base with compressed air, thereby for driving charged or dirty filtrating mass towards the washing zone. Means is provided for discharging the washing water from the washing zone. A pressurized air header is disposed above the filtrating layer.

According to a further feature of the invention, means are provided for feeding pressurized air to the pressurized air header in a continuous or intermittent manner, advantageously in sycnhronism with the feeding of compressed air to the axial tube to achieve recovery of the charged filtrating mass.

BRIEF DESCRIPTION OF THE DRAWING

Hereafter is described, only by way of a non limiting example, an embodiment of the apparatus according to the invention, with reference to the accompanying drawing, wherein the single FIGURE is a schematic view in cross-section of the apparatus of the invention.

DETAILED DESCRIPTION OF THE INVENTION

The apparatus is made of a cylindrical and conical enclosure 1 including a filtration zone 2 filled with a granular material such as sand. The water to be treated is introduced by header 3 and flows through the filtrating layer from the bottom of the top. The filtrated water is collected by an overfall 4. The charged filtrating mass is sucked in a central tube 5 by means of a compressed air ejector 6, fed by channel 7 with compressed air at a pressure of 3 to 4 bars. Thus, the compressed air entrains the sand to move towards a washing zone 8. The washed sand is recycled by a cylindrical outer tube 9 downwardly towards the filtrating layer, the washing water being discharged by an overfall 10.

According to the invention, a header 11 of pressurized air, at a pressure of 0.1 to 0.4 bar, is disposed above the filtrating layer and underneath outer tube 9, such pressurized air providing fluidization of the sand falling back from outer tube 9 after a first washing operation and ensuring moreover an extra washing of such sand with air and water.

The header 11 of pressurized air is fed by channel 12 which is connected to channel 7 for feeding compressed air to ejector 6 and which is provided with means, such as a pressure reducing valve and a flow control valve 3, for providing an intermittent supply of pressurized air to header 11 and, advantageously, in sychronism with compressed air supplied to ejector 6. The apparatus includes moreover regulation means, such as a timing unit 14, allowing regulation of the washing cycles as a function of the degree of clogging of the filtrating layer.

What is claimed is:

1. In a method of filtering a liquid to be treated by passing said liquid upwardly through a bed of granular filtering material, during which said filtering material removes particles from said liquid and becomes soiled thereby, and the thus filtered liquid is collected above said bed, the improvement comprising cleaning the thus soiled filtering material without interrupting said filtering operation by:

providing a tube extending from a lower portion of said bed of granular filtering material to a position above the upper surface of said bed;

injecting compressed gas into said tube, thereby driving said soiled filtering material upwardly through said tube and therein performing a first washing of said filtering material by means of said compressed gas, and then discharging said filtering material from the upper end of said tube, such that said filtering material falls downwardly toward said upper surface of said bed; and directing pressurized gas upwardly from above said bed toward said filtering material falling downwardly from said upper end of said tube, thereby fluidizing said falling filtering material and performing a second washing of said filtering material by means of said pressurized gas and filtered liquid above said bed, after which the thus twice washed filtering material settles onto said upper surface of said bed.

2. The improvement claimed in claim 1, wherein said pressurized gas is directed upwardly at a pressure of 0.1 to 0.4 bar.

3. The improvement claimed in claim 1, wherein said compressed gas is injected into said tube at a pressure of 3 to 4 bars.

4. The improvement claimed in claim 1, comprising performing said injecting and said directing intermittently and in synchronism.

5. In an apparatus for filtering a liquid to be treated, said apparatus including means defining a closed enclosure having therein a bed of granular filtering material, means for introducing liquid to be treated into a lower portion of said bed such that said liquid to be treated passes upwardly through said bed, during which said filtering material removes particles from said liquid and becomes soiled thereby, and means for collecting and discharging the thus filtered liquid from above the upper surface of said bed, the improvement comprising means for cleaning the thus soiled filtering material without interrupting the filtering operation, said cleaning means comprising:

a tube extending from a lower portion of said bed of filtering material to a position above said surface of said bed;

means for injecting compressed gas into said tube, and thereby for driving said soiled filtering material upwardly through said tube and therein performing a first washing of said filtering material by means of said compressed gas, and then for discharging said filtering material from the upper end of said tube, such that said filtering material falls downwardly toward said upper surface of said bed; and means for directing pressurized gas upwardly from above said bed toward said filtering material falling downwardly from said upper end of said tube, and thereby for fluidizing said falling filtering material and performing a second washing of said filtering material by means of said pressurized gas and filtered liquid from above said bed, after which the thus twice washed filtering material settles onto said upper surface of said bed.

6. The improvement claimed in claim 5, wherein said directing means comprises a pressurized gas header positioned above said upper surface of said bed, and means for supplying said pressurized gas to said header to be discharged therefrom at a pressure of 0.1 to 0.4 bar.

7. The improvement claimed in claim 5, wherein said injecting means comprises means for supplying said compressed gas to said tube at a pressure of 3 to 4 bars.

8. The improvement claimed in claim 5, further comprising outer tube means, surrounding said upper end of said tube and extending above said directing means, for retaining said falling filtering material during said fluidizing and second washing thereof.

9. The improvement claimed in claim 5, further comprising means for controlling the flow rate and pressure of said pressurized gas supplied to said directing means.

10. The improvement claimed in claim 9, wherein said controlling means comprises means for supplying said pressurized gas in sychronism with the supply of said compressed gas.

11. The improvement claimed in claim 10, wherein said controlling means includes means for regulating the supplies of said pressurized gas and said compressed gas as a function of the degree of clogging of said bed by particles removed thereby from the liquid being treated.

* * * * *